(12) United States Patent
Zhao et al.

(10) Patent No.: US 11,874,503 B1
(45) Date of Patent: Jan. 16, 2024

(54) DIFFRACTIVE OPTICAL WAVEGUIDE AND DISPLAY DEVICE

(71) Applicant: Jiaxing UPhoton Optoelectronics Technology Co., Ltd., Jiaxing (CN)

(72) Inventors: Xingming Zhao, Jiaxing (CN); Zhentao Fan, Jiaxing (CN); Qingfeng Zhu, Jiaxing (CN); Kehan Tian, Jiaxing (CN)

(73) Assignee: JIAXING UPHOTON OPTOELECTRONICS TECHNOLOGY CO., LTD, Jiaxing (CN)

( * ) Notice: Subject to any disclaimer, the term of this patent is extended or adjusted under 35 U.S.C. 154(b) by 0 days.

(21) Appl. No.: 18/346,410

(22) Filed: Jul. 3, 2023

(51) Int. Cl.
*G02B 6/34* (2006.01)
*G02B 27/00* (2006.01)

(52) U.S. Cl.
CPC ........... *G02B 6/34* (2013.01); *G02B 27/0081* (2013.01)

(58) Field of Classification Search
CPC .. G02B 6/34; G02B 27/0081; G02B 27/4205; G02B 27/286; G02B 27/4272; G02B 27/0172
See application file for complete search history.

(56) References Cited

U.S. PATENT DOCUMENTS

2017/0059879 A1* 3/2017 Vallius ............... G02B 27/4205
2017/0102543 A1   4/2017 Vallius

FOREIGN PATENT DOCUMENTS

| CN | 113777703 A | 12/2021 |
| CN | 114153073 A | 3/2022 |
| CN | 114647080 A | 6/2022 |

OTHER PUBLICATIONS

English translation of First Chinese Office Action for priority Chinese Patent Application No. 202210778028.2 dated Nov. 11, 2022.
First Chinese Office Action for priority Chinese Patent Application No. 202210778028.2 dated Nov. 11, 2022 (in Chinese).

(Continued)

*Primary Examiner* — Michael P Mooney
(74) *Attorney, Agent, or Firm* — Renner, Kenner, Greive, Bobak, Taylor & Weber

(57) ABSTRACT

The present application provides a diffractive optical waveguide for optical pupil expansion and a display device, comprising a waveguide substrate having a coupling-in region in which a coupling-in grating is located and a coupling-out region. A first and a second diffractive light obtained by the input light diffracted by the coupling-in grating are respectively totally reflected in the waveguide substrate and directed to a first and a second coupling-out regions. A first coupling-out grating disposed in the first coupling-out region and a second coupling-out grating disposed in the second coupling-out region both are configured to couple at least a portion of light propagating therein out of the waveguide substrate by diffraction. The first and the second coupling-out regions are respectively located at both sides of the coupling-in region. A center of the coupling-in region deviates from the center line connecting the centers of the first and the second coupling-out regions.

17 Claims, 6 Drawing Sheets

(56) References Cited

OTHER PUBLICATIONS

English translation of Response to First Chinese Office Action for priority Chinese Patent Application No. 202210778028.2 filed on Dec. 23, 2022.
Response to First Chinese Office Action for priority Chinese Patent Application No. 202210778028.2 filed on Dec. 23, 2022 (in Chinese).
English translation of Second Chinese Office Action for priority Chinese Patent Application No. 202210778028.2 dated Feb. 15, 2023.
Second Chinese Office Action for priority Chinese Patent Application No. 202210778028.2 dated Feb. 15, 2023 (in Chinese).
English translation of Response to Second Chinese Office Action for priority Chinese Patent Application No. 202210778028.2 filed Apr. 6, 2023.
Response to Second Chinese Office Action for priority Chinese Patent Application No. 202210778028.2 filed Apr. 6, 2023 (in Chinese).
English translation of Notice of Grant of Patent Right for Invention for priority Chinese Patent Application No. 202210778028.2 dated May 29, 2023.
Notice of Grant of Patent Right for Invention for priority Chinese Patent Application No. 202210778028.2 dated May 29, 2023 (in Chinese).

\* cited by examiner

DIFFRACTIVE OPTICAL WAVEGUIDE AND DISPLAY DEVICE

CROSS-REFERENCE TO RELATED APPLICATION

The present application claims priority to Chinese Patent Application No. 202210778028.2, filed on Jul. 4, 2022, which is hereby incorporated by reference in its entirety.

BACKGROUND

The present application generally relates to the technical field of diffractive optics, and more specifically to a diffractive optical waveguide and a display device.

With the high development of semiconductor technology, the way of interaction between human and computer is developing rapidly, and Augmented Reality (AR) display, among others, can provide multidimensional information to human beings and has been widely, concerned. AR glasses are one of the important mediums in the field of augmented reality display. The diffractive optical waveguide has the advantages of allowing production with high ability for mass production and a light, thin form, and is gradually approved in the field of AR display, being expected to become the mainstream technology development direction of AR field in the future. The coupling-out grating is one of the essential components of the diffractive optical waveguide.

However, the current design of conventional diffractive optical waveguide makes AR glasses mostly use two sets of AR display modules, that is, two sets of optical machines and two sets of diffractive optical waveguides, and this requires a high energy consumption, which is contrary to the concept that smart wear requires low energy consumption.

Therefore, it is necessary to improve the diffractive optical waveguide to solve at least one technical problem.

SUMMARY

The present application is proposed to solve at least one of the above-mentioned problems. Specifically, the first aspect of the present application provides a diffractive optical waveguide for optical pupil expansion, comprising:

a waveguide substrate comprising a coupling-in region and a coupling-out region, wherein the coupling-out region includes a first coupling-out region and a second coupling-out region, and the first coupling-out region and the second coupling-out region are respectively used for corresponding to a left eye and a right eye of human eyes;

a coupling-in grating disposed on or in the waveguide substrate and located in the coupling-in region and configured to couple input light into the waveguide substrate to cause the light to propagate within the waveguide substrate through total reflection, wherein a first diffractive light obtained by the input light diffracted by the coupling-in grating is totally reflected in the waveguide substrate and directed to the first coupling-out region, and a second diffractive light obtained by the input light diffracted by the coupling-in grating is totally reflected in the waveguide substrate and directed to the second coupling-out region;

a coupling-out grating comprising a first coupling-out grating disposed on or in the waveguide substrate and located in the first coupling-out region and a second coupling-out grating disposed on or in the waveguide substrate and located in the second coupling-out region, the first coupling-out grating and the second coupling-out grating both configured to couple at least a portion of light propagating therein out of the waveguide substrate by diffraction, wherein, the first coupling-out region and the second coupling-out region are respectively located at both sides of the coupling-in region, and a center of the coupling-in region deviates from a center line connecting a center of the first coupling-out region and a center of the second coupling-out region.

Exemplarily, the first coupling-out region and the second coupling-out region are mirror-symmetric with respect to a central axis of the waveguide substrate, and the central axis of the waveguide substrate passes through the center of the coupling-in region and is perpendicular to the center line; and/or the waveguide substrate is mirror-symmetric with respect to the central axis; and/or a distance between the center of the coupling-in region and the center of the first coupling-out region is equal to a distance between the center of the coupling-in region and the center of the second coupling-out region.

Exemplarily, the center of the coupling-in region is located above a center of the waveguide substrate.

Exemplarily, an offset of the center of the coupling-in region relative to the center line satisfies the following formula:

$$0 < H < \max\left(\frac{\sqrt{L^2 + W^2}}{2}, \frac{D}{2}\right)$$

wherein H is an offset of the center of the coupling-in region relative to the center line; D is a distance between the center of the first coupling-out region and the center of the second coupling-out region; L is a maximum transverse width of the first coupling-out region or the second coupling-out region; and W is a maximum longitudinal width of the first coupling-out region or the second coupling-out region.

Exemplarily, an offset of the center of the coupling-in region relative to the center line satisfies the following formula:

$$\frac{d}{2} < H < \max\left(\frac{\sqrt{L^2 + W^2}}{2} - \frac{d}{2}, \frac{D}{2} - \frac{d}{2}\right)$$

wherein H is an offset of the center of the coupling-in region relative to the center line; D is a distance between the center of the first coupling-out region and the center of the second coupling-out region; L is a maximum transverse width of the first coupling-out region or the second coupling-out region; W is a maximum longitudinal width of the first coupling-out region or the second coupling-out region; and d is a maximum transverse dimension of the coupling-in region.

Exemplarily, the maximum transverse width of the first coupling-out region or the second coupling-out region is greater than 20 mm and less than 40 mm;

the maximum longitudinal width of the first coupling-out region or the second coupling-out region is greater than 20 mm and less than 30 mm;

a spacing between the center of the second coupling-out region and the center of the first coupling-out region is 55 mm to 75 mm;

the shape of the coupling-in region is a circle or polygon, wherein the maximum transverse dimension of the coupling-in region is 2 mm to 6 mm.

Exemplarily, a period of the coupling-in grating is 350 nm to 600 nm; and/or the coupling-in grating is a one-dimensional grating, a two-dimensional grating, a metasurface coupling-in structure, or is formed by a first coupling-in grating and a second coupling-in grating with different grating vectors joined together, wherein the first coupling-in grating and the second coupling-in grating both are one-dimensional gratings.

Exemplarily, when the coupling-in grating is a one-dimensional grating with the same grating vector, one of the first diffractive light and the second diffractive light is a class −1 diffractive light, and the other is a class +1 diffractive light.

Exemplarily, when the coupling-in grating is formed by the first coupling-in grating and the second coupling-in grating with different grating vectors joined together, the first coupling-in grating is close to the first coupling-out region, and the second coupling-in grating is close to the second coupling-out region, wherein the first diffractive light obtained by the input light diffracted by the first coupling-in grating is totally reflected in the waveguide substrate and directed to the first coupling-out region, and the second diffractive light obtained by the input light diffracted by the second coupling-in grating is totally reflected in the waveguide substrate and directed to the second coupling-out region.

Exemplarily, when the coupling-in grating is formed by the first coupling-in grating and the second coupling-in grating with different grating vectors joined together, an included angle between a grating vector of the first coupling-in grating and a grating vector of the second coupling-in grating is greater than 90° and less than or equal to 180°.

Exemplarily, a grating period of the coupling-out grating is 350 nm to 600 nm; and/or the coupling-out grating is a two-dimensional grating, or a combination of a one-dimensional grating and a two-dimensional grating.

Exemplarily, when the coupling-out grating is a combination of a one-dimensional grating and a two-dimensional grating, the first coupling-out region and the second coupling-out region both comprise a plurality of partitions; a coupling-out grating arranged in a first group of partitions in the plurality of partitions is a two-dimensional grating, and a coupling-out grating arranged in a second group of partitions in the plurality of partitions is a one-dimensional grating.

Exemplarily, a grating vector of the one-dimensional grating arranged in some partitions of the second group of partitions is different from that of the one-dimensional grating arranged in the other partitions.

Exemplarily, a sum of a grating vector of the coupling-in grating and a grating vector of the coupling-out grating is zero.

Exemplarily, the first coupling-out region and the second coupling-out region both are of polygons, and the number of linear edges of the polygons is greater than or equal to 3; and/or a thickness of the waveguide substrate is greater than or equal to 0.4 mm, and less than or equal to 2 mm.

The present application further provides a display device, comprising:

the aforementioned diffractive optical waveguide, an optical machine, and an actuating device, wherein the actuating device is configured to actuate the optical machine to project image light onto the coupling-in grating of the diffractive optical waveguide.

Exemplarily, an optical axis of the image light projected by the optical machine is perpendicular to a surface of the waveguide substrate of the diffractive optical waveguide.

Exemplarily, the optical machine is any one of DLP optical machine, Mems optical machine, and MicroLED optical machine.

Exemplarily, the display device is a near-eye display device, comprising: a lens and a frame for holding the lens near eyes, the lens including said diffractive optical waveguide.

Exemplarily, the display device is an augmented reality display device or a virtual reality display device.

In the diffractive optical waveguide of the present application, the center of the coupling-in region deviates from the center line connecting the center of the first coupling-out region and the center of the second coupling-out region, such that the optical machine deviates from the center line when the diffractive optical waveguide is applied to a display device such as a near-eye display device and is placed on the nose bridge of the wearer. As such, the diffractive optical waveguide is more ergonomic. Moreover, by enabling the diffractive optical waveguide of the present application to couple the input light to the user's eyes through pupil expansion, there is no need to equip the user with two sets of diffractive waveguides and two sets of optical machines, whose structure is simpler; assembly difficulty is significantly reduced; and power consumption is lower, compared to the display device with two sets of diffractive optical waveguides.

Since the display device of the present application comprises the aforementioned diffractive optical waveguide, it has substantially the same advantages as the diffractive optical waveguide.

BRIEF DESCRIPTION OF THE DRAWINGS

In order to illustrate the technical solutions in the embodiments of the present application more clearly, the following briefly introduces the drawings that need to be used in the description of the embodiments. Apparently, the drawings described in the following are only some embodiments of the present application. For those of ordinary skilled in the art, other drawings can also be obtained from these drawings without creative work.

DETAILED DESCRIPTION

Figure 1A:
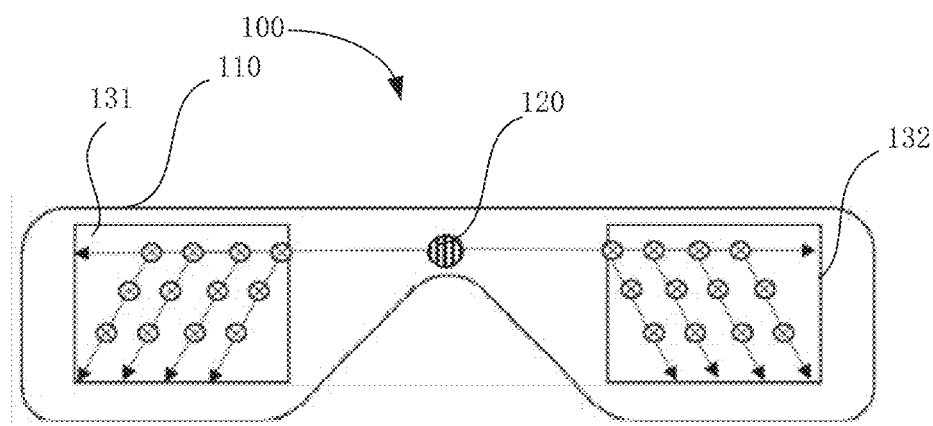
FIG. 1A shows a front view of a diffractive optical waveguide according to an embodiment of the present application.

In order to make the objectives, technical solutions and advantages of the present application more apparent, the exemplary embodiments according to the present application will be described in detail below with reference to the accompanying drawings. Apparently, the described embodiments are only a part of the embodiments of the present application, rather than all the embodiments of the present application, and it should be understood that the present application is not limited by the example embodiments described herein. Based on the embodiments of the present application described herein, all other embodiments obtained by those skilled in the art without creative work shall fall within the protection scope of the present application.

In the following description, numerous specific details are set forth in order to provide a more thorough understanding of the present application. However, it is obvious to those skilled in this art that the present application may be implemented without one or more of these details. Some technical features well-known in this art are not described in other examples in order to avoid confusion with the present application.

It is to be understood that the present application can be implemented in various forms but should not be construed as being limited to the embodiments set forth herein. On the contrary, these embodiments are provided to make the disclosure thorough and complete and the scope of the application be completely delivered to those skilled in the art.

In order to understand the present application thoroughly, a detailed structure is provided in the following description so as to elucidate the technical solutions presented in the present application. Alternative embodiments of the present application are illustrated in detail as below. However, the present application may further have other embodiments in addition to these detailed descriptions.

In order to solve the aforementioned technical problem, the present application provides a diffractive optical waveguide for optical pupil expansion, comprising: a waveguide substrate comprising a coupling-in region and a coupling-out region, wherein the coupling-out region includes a first coupling-out region and a second coupling-out region, and the first coupling-out region and the second coupling-out region are respectively used for corresponding to a left eye and a right eye of human eyes; a coupling-in grating disposed on or in the waveguide substrate and located in the coupling-in region and configured to couple input light into the waveguide substrate to cause the light to propagate within the waveguide substrate through total reflection, wherein a first diffractive light obtained by the input light diffracted by the coupling-in grating is totally reflected in the waveguide substrate and directed to the first coupling-out region, and a second diffractive light obtained by the input light diffracted by the coupling-in grating is totally reflected in the waveguide substrate and directed to the second coupling-out region; a first coupling-out grating disposed on or in the waveguide substrate and located in the first coupling-out region and a second coupling-out grating disposed on or in the waveguide substrate and located in the second coupling-out region, the first coupling-out grating and the second coupling-out grating both configured to couple at least a portion of light propagating therein out of the waveguide substrate by diffraction, wherein the first coupling-out region and the second coupling-out region are respectively located at both sides of the coupling-in region, and a center of the coupling-in region deviates from a center line connecting a center of the first coupling-out region and a center of the second coupling-out region.

In the diffractive optical waveguide of the present application, the center of the coupling-in region deviates from the center line connecting the center of the first coupling-out region and the center of the second coupling-out region, such that the optical machine deviates from the center line when the diffractive optical waveguide is applied to a display device such as a near-eye display device and is placed on the nose bridge of the wearer. As such, the diffractive optical waveguide is more ergonomic. Moreover, by enabling the diffractive optical waveguide of the present application to couple the input light to the user's eyes through pupil expansion, there is no need to equip the user with two sets of diffractive waveguides and two sets of optical machines, whose structure is simpler; assembly difficulty is significantly reduced; and power consumption is lower, compared to the display device with two sets of diffractive optical waveguides.

The diffractive optical waveguide and the display device of the present application will be described below with reference to FIGS. 1A to 10. The features of the various embodiments of the present application may be combined with each other without conflict.

Figure 1B:
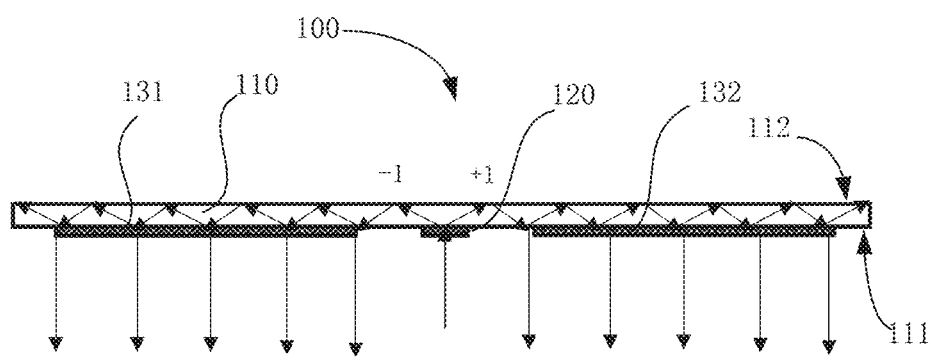
FIG. 1B shows a top view of a diffractive optical waveguide according to an embodiment of the present application.

The present application provides a diffractive optical waveguide 100 for optical pupil expansion, wherein FIGS. 1A and 1B illustratively show an example of the diffractive optical waveguide 100 for optical pupil expansion according to an embodiment of the present invention, namely the diffractive optical waveguide 100. As shown in FIGS. 1A and 1B, the diffractive optical waveguide 100 comprises a waveguide substrate 110. The waveguide substrate 110 can be made of glass, optical plastic, or other optical transmission materials.

Alternatively, the waveguide substrate 110 can have first and second substantially flat surfaces 111, 112, wherein the first surface 111 is opposite to the second surface 112, wherein the first surface 111 can be the surface of the display device with the waveguide substrate 110 on the side facing the viewer's eyes. With the waveguide substrate 110, light may propagate in a direction substantially parallel to the first surface 111 and the second surface 112 through total internal reflection.

Alternatively, the waveguide substrate 110 includes the coupling-in region and the coupling-out region, wherein the coupling-out region includes a first coupling-out region and a second coupling-out region. The first coupling-out region and the second coupling-out region are respectively used for corresponding to the left eye and right eye of human eyes.

Figure 2:
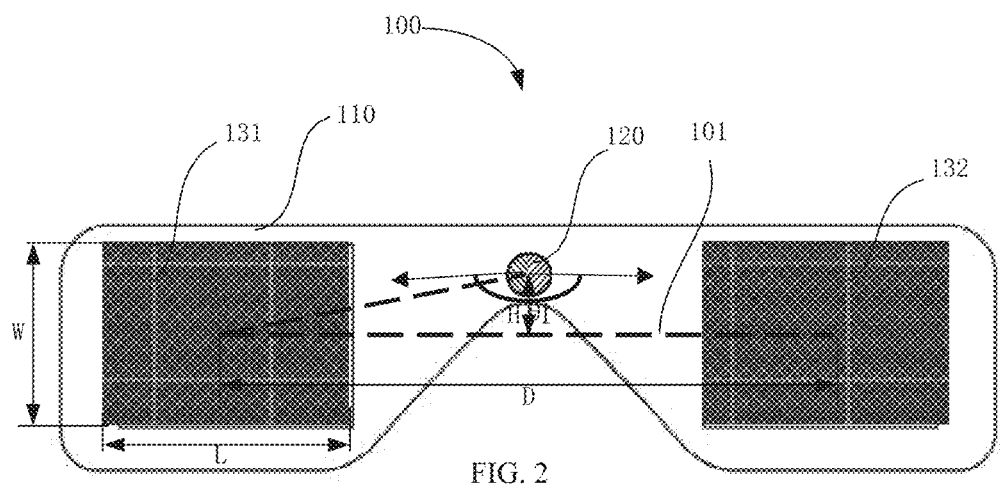
FIG. 2 shows a schematic view of a diffractive optical waveguide in which a waveguide substrate is butterfly-shaped according to an embodiment of the present application.
Figure 3:
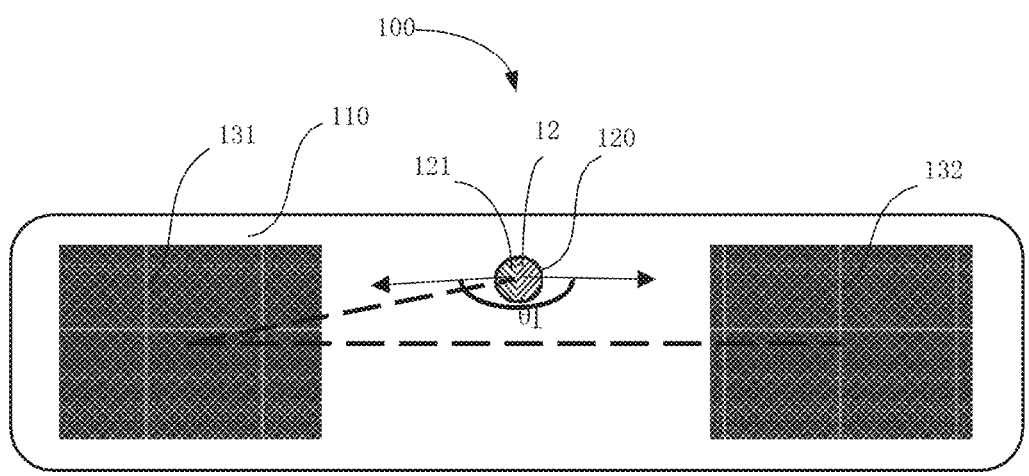
FIG. 3 shows a schematic view of a diffractive optical waveguide in which a waveguide substrate is rectangular according to an embodiment of the present application.

The shape of the waveguide substrate 110 can be any suitable shape, for example, a rectangle (as shown in FIG. 3), a dumbbell shape, or a butterfly shape (as shown in FIG. 2). Alternatively, the shape of the waveguide substrate 110 can be mirror-symmetric with respect to a central axis of the waveguide. The central axis can be a central axis of the waveguide substrate 110 located between the first coupling-out region and the second coupling-out region.

The thickness of the waveguide substrate 110 can be any suitable thickness, for example, the thickness of the waveguide substrate 110 is greater than or equal to 0.4 mm, and is less than or equal to 2 mm. The waveguide substrate 110 in this thickness range can provide good optical properties without being too thick or heavy to impact the user's experience. It is worth mentioning that the thickness of the waveguide substrate 110 can be the dimension of the waveguide substrate 110 in a direction substantially perpendicular to the first surface 111 and the second surface 112.

Further, as shown in FIGS. 1A and 1B, the diffractive optical waveguide 100 of the present application further comprises a coupling-in grating 120, wherein the coupling-in grating 120 is disposed on or in the waveguide substrate 110 and located in the coupling-M region, and is configured to couple input light into the waveguide substrate 110 to cause the light to propagate within the waveguide substrate 110 through total reflection, such that the light propagates to the coupling-out grating. Wherein the first diffractive light obtained by the input light diffracted by the coupling-in grating 120 is totally reflected in the waveguide substrate 110 and directed to the first coupling-out region, and the second diffractive light obtained by the input light diffracted by the coupling-in grating 120 is totally reflected in the waveguide substrate 110 and directed to the second coupling-out region.

Continuing with reference to FIG. 1A and FIG. 1B, the waveguide substrate 110 of the present application further comprises a coupling-out grating. The coupling-out grating can include a first coupling-out grating 131 and a second coupling-out grating 132. The first coupling-out grating 131 is disposed on or in the waveguide substrate 110 and located in the first coupling-out region, and the second coupling-out grating 132 is disposed on or in the waveguide substrate 110 and located in the second coupling-out region. The first coupling-out grating 131 and the second coupling-out grating 132 both are configured to couple at least a portion of light propagating therein out of the waveguide substrate 110 by diffraction to allow the viewer's eyes to receive the coupled-out light. Because the coupling-out gratings of the present application are respectively opposite to the viewer's left and right eyes, the light can be coupled out to the viewer's eyes. The display device using the diffractive optical waveguide 100 of the present application does not need to equip the user with two sets of diffractive optical waveguides and two sets of optical machines, whose structure is simpler; assembly difficulty is significantly reduced; and power consumption is lower, compared to the display device with two sets of diffractive optical waveguides.

When the light coupled into the coupling-in grating 120 is, for example, image light projected by a projector, the light coupled out from the first coupling-out grating 131 and the second coupling-out grating 132 is at least a portion of the image light, and the portion of the image light is guided to the viewer's eyes through the coupling-out grating so that the image projected by the projector is visible to the viewer's eyes. Wherein, the first coupling-out grating 131 and the second coupling-out grating 132 play the role of pupil expansion. After the coupling-out grating receives a relatively thin incident light beam from the coupling-in grating 120, the coupling-out grating continuously diffracts and expands the light beam in two directions in a plane while partially couples-out the light from the waveguide substrate 110 for the purpose of optical pupil expansion in the plane, so that the viewer can observe the display information carried by the incident light beam in a relatively large eyebox (EB).

Continuing with reference to FIGS. 1A and 1B, the coupling-in grating 120, the first coupling-out grating 131 and the second coupling-out grating 132 can be located on the same side of the waveguide substrate 110, for example, all are disposed on the first surface 111 of the waveguide substrate 110, or can be located on either side, i.e., on the first surface 111 and the second surface 112, respectively.

In an example of the present application, as shown in FIGS. 1A to 3, the coupling-in grating 120 and the coupling-out grating (e.g., the first coupling-out grating 131 and the second coupling-out grating 132) are located on the same side surface of the waveguide substrate 110.

Figure 4:
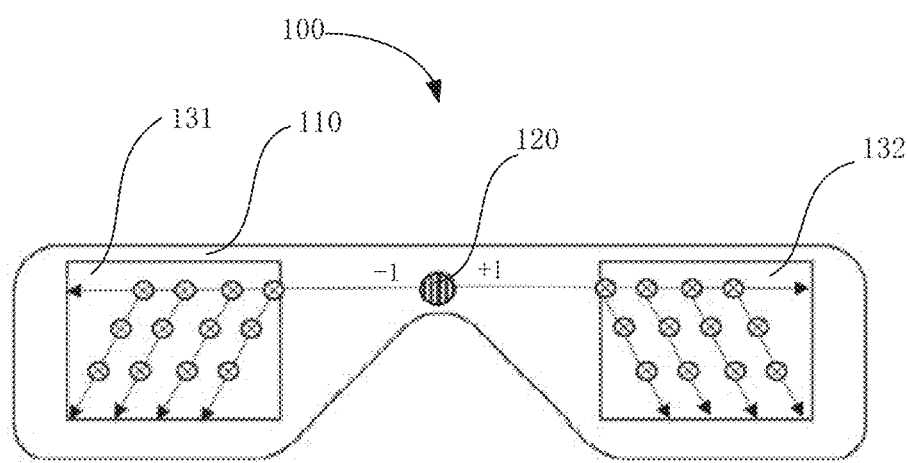
FIG. 4 shows a schematic view of a diffractive optical waveguide in which a coupling-in grating is a one-dimensional straight-tooth grating according to an embodiment of the present application.
Figure 6:
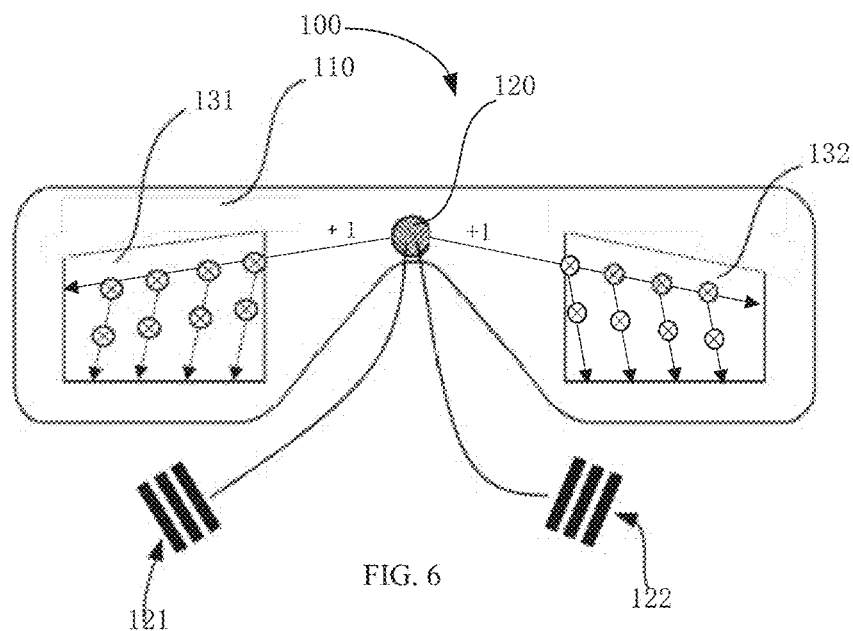
FIG. 6 shows a schematic view of a diffractive optical waveguide according to yet another embodiment of the present application.

The coupling-in grating 120 can be a one-dimensional grating, such as a linear grating (also referred to as a straight-tooth grating), or a slanted grating, a non-blazed grating, and other suitable types of gratings, or the coupling-in grating 120 can also be a metasurface coupling-in structure. In some examples, the coupling-in grating 120 is a one-dimensional grating, a two-dimensional grating, or is formed by the first coupling-in grating 121 and the second coupling-in grating 122 with different grating vectors joined together. Wherein, the first coupling-in grating 121 and the second coupling-in grating 122 both are one-dimensional gratings. As shown in FIG. 4, for example, the coupling-in grating 120 is a one-dimensional grating, which for example may be a one-dimensional straight-tooth grating. The characteristic of the straight-tooth grating is that the diffraction efficiency of class ±1 is equal. In some examples, the coupling-in grating 120 may also be formed by the first coupling-in grating 121 and the second coupling-in grating 122 with different grating vectors joined together, as shown in FIGS. 2, 3 and 6. Alternatively, as shown in FIG. 3, the included angle between the grating vector of the first coupling-in grating 121 and the grating vector of the second coupling-in grating 122 is θ1, wherein 90"<θ1<180', and the included angle is the minimum one therebetween.

The coupling-in grating 120 can be an optical element including a periodic structure, which can be fabricated by any suitable microfabrication process. For example, the grating can be fabricated on the surface or inside of the waveguide substrate 110 by photolithography or on the waveguide substrate 110 by nanoimprint lithography, thereby forming a surface relief diffraction grating. Alternatively, the period of the coupling-in grating 120 can be 350 nm to 600 nm, or other suitable period lengths.

In some examples, the central axis of the waveguide substrate 110 can also generally pass through the center of the coupling-in region, and be perpendicular to the center line 101 between the center of the first coupling-out region and the center of the second coupling-out region, wherein the first coupling-out region and the second coupling-out region are mirror-symmetrical with respect to the central axis. The distance between the center of the coupling-in region and the center of the first coupling-out region is equal to the distance between the center of the coupling-in region and the center of the second coupling-out region. Since the viewer's left and right eyes are symmetrical, the first coupling-out region and the second coupling-out region of the present application are mirror-symmetrical with respect to the central axis, such that the configuration of the coupling-out region on the waveguide substrate 110 is more ergonomic.

In order to make the configuration of the coupling-in grating 120 on the waveguide substrate 110 more ergonomic, as shown in FIG. 2, the first and second coupling-out regions are respectively located at both sides of the coupling-in regions, and the center of the coupling-in region deviates from the center line 101 connecting the center of the first coupling-out region and the center of the second coupling-out region. For example, the center of the coupling-in region is located above the center of the waveguide substrate 110 (the center of the waveguide substrate 110 can be located on the center line 101), and the top of the center of the waveguide substrate 110 can be determined based on an up-down direction of the waveguide substrate 110 when the diffractive optical waveguide 100 is worn. Deviating the center of the coupling-in region from the center line 101 enables the optical machine of the display device corresponding to the coupling-in region to be placed on the nose bridge of the wearer, which is more ergonomic. Moreover, by enabling the diffractive optical waveguide of the present application to couple the input light to the user's eyes through pupil expansion, there is no need to equip the user with two sets of diffractive waveguides and two sets of optical machines, whose structure is simpler; assembly difficulty is significantly reduced; and power consumption is lower, compared to the display device with two sets of diffractive optical waveguides.

It is worth mentioning that when wearing the diffractive optical waveguide 100, the center line 101 connecting the center of the first coupling-out region and the center of the second coupling-out region is substantially a horizontal line, which can avoid the problem of a high and a low image difference between two eyes.

As shown in FIG. 2, the offset of the center of the coupling-in region relative to the center line 101 satisfies the following formula:

$$0 < H < \max\left(\frac{\sqrt{L^2 + W^2}}{2}, \frac{D}{2}\right)$$

wherein H is an offset of the center of the coupling-in region relative to the center line 101; D is the distance between the center of the first coupling-out region and the center of the second coupling-out region; L is a maximum transverse width of the first coupling-out region or the second coupling-out region, and W is a maximum longitudinal width of the first coupling-out region or the second coupling-out region.

Furthermore, in an example, the offset of the center of the coupling-in region relative to the center line 101 satisfies the following formula:

$$\frac{d}{2} < H < \max\left(\frac{\sqrt{L^2 + W^2}}{2} - \frac{d}{2}, \frac{D}{2} - \frac{d}{2}\right)$$

wherein H is an offset of the center of the coupling-in region relative to the center line 101; D is the distance between the center of the first coupling-out region and the center of the second coupling-out region; L is a maximum transverse width of the first coupling-out region or the second coupling-out region; W is a maximum longitudinal width of the first coupling-out region or the second coupling-out region; and d is a maximum transverse dimension of the coupling-in region.

It is worth mentioning that in examples of this application, transverse direction can be the direction parallel to the center line 101, while longitudinal direction can be the direction perpendicular to the center line 101.

In an example, the shape of the coupling-in region can be any suitable shape, such as polygon, circle, oval or other suitable irregular shape. Alternatively, the maximum transverse dimension of the coupling-in region can be 2 mm to 6 mm. For example, when the shape of the coupling-in region is circular, the maximum transverse dimension of the coupling-in region is defined as the diameter of the circle, which can be 2 min to 6 mm, or it can also be any other suitable dimension, wherein the circular design can match the dimension of the lens of the optical machine.

Alternatively, the maximum transverse width of the first coupling-out region or the second coupling-out region is greater than 20 mm and less than 40 mm, or can be other suitable dimension.

In an example, the maximum longitudinal width of the first coupling-out region or the second coupling-out region is greater than 20 mm and less than 30 mm, or may be other suitable dimension.

In an example, the distance between the center of the second coupling-out region and the center of the first coupling-out region is 55 mm to 75 mm, or may also be other suitable dimension. The value of distance D between the center of the second coupling-out region and the center of the first coupling-out region can be reasonably selected according to actual needs, and the distance between the two centers is generally consistent with the distance between the wearer's eyes.

Figure 5:
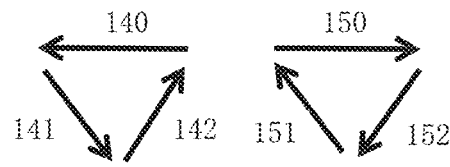
FIG. 5 shows a schematic view of grating vectors of the coupling-in grating, a first coupling-out grating and a second coupling-out grating in FIG. 4.

In some examples, as shown in FIGS. 4 and 5, when the coupling-in grating 120 is a one-dimensional grating (e.g., a one-dimensional straight-tooth grating) with the same grating vector, one of the first and second diffractive light is class −1 diffractive light, and the other is class +1 diffractive light. The characteristic of the straight-tooth grating is that the diffraction efficiency of class ±1 is equal. The grating vector of the coupling-in grating 120 is 140 and 150, and the vector direction is (−1, 0, 0). After the light passes through the coupling-in grating 120, the class −1 diffractive light is totally reflected in the waveguide along the horizontal direction and directed to the first coupling-out grating 131, which is a two-dimensional grating with a grating vector 141 and a grating vector 142. The vector direction of the grating vector 141 is (−1, −√3, 0), and the vector direction of the grating vector 142 is (1, √3, 0). The light is coupled out into the human eyes after reaching the first coupling-out grating 131. After the light passes through the coupling-in grating. 120, the class +1 diffractive light is totally reflected in the waveguide and directed to the second coupling-out grating 132, which is a two-dimensional grating with a grating vector 151 and a grating vector 152. The vector direction of the grating vector 151 is (−1, √3, 0), and the vector direction of the grating vector 152 is (−1, √3, 0). The coupled-in light is coupled out into the human eyes after reaching the second coupling-out grating 132. Compared to the traditional diffractive optical waveguide, it is usually one coupling-in grating 120 corresponding to one coupling-out grating. The coupling-out grating can only obtain class +1 or class −1 diffractive light, using the coupling-in grating. 120 for single-stage diffraction, so the utilization rate is low. The coupling-in end of this application uses the class ±1 diffraction of the coupling-in grating 120, so the light utilization rate is effectively improved.

Figure 7:
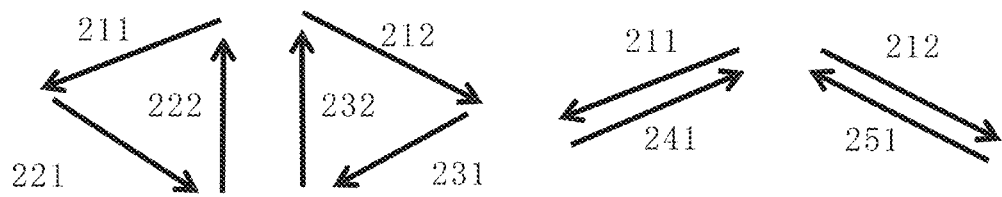
FIG. 7 shows a schematic view of grating vectors of the coupling-in grating, the first coupling-out grating and the second coupling-out grating in FIG. 6.

In another embodiment, as shown in FIGS. 6 and 7, when the coupling-in grating 120 is formed by the first coupling-in grating 121 and the second coupling-in grating 122 with different grating vectors joined together, the first coupling-in grating 121 is close to the first coupling-out region, and the second coupling-in grating 122 is close to the second coupling-out region. Wherein the first diffractive light obtained by the input light diffracted by the first coupling-in grating 121 is totally reflected in the waveguide substrate 110 and directed to the first coupling-out region, and is coupled out into the human eyes through the first coupling-out grating 131. The second diffractive light obtained by the input light diffracted by the second coupling-in grating 122 is totally reflected in the waveguide substrate 110 and directed to the second coupling-out region, and is coupled out into the human eyes through the second coupling-out grating 132.

As shown in FIGS. 6 and 7, the region of the coupling-in grating 120 can be circular, and the semicircle near the side of the first coupling-out grating 131 is the first coupling-in grating 121 (fir example, a first type of one-dimensional straight-tooth grating), whose grating vector is 211 and vector direction is $(-\sqrt{3}, -1, 0)$. After light passes through the first type of one-dimensional straight-tooth grating, the class +1 diffraction is totally reflected in the waveguide in a direction of 30° from the horizontal plane and directed to the first coupling-out grating 131. The first coupling-out grating 131 is a two-dimensional grating and has a grating vector of 221 with a vector direction of $(\sqrt{3}, -1, 0)$, a grating vector of 222 with a vector direction of $(0, 2, 0)$, and a grating vector of 241 with a vector direction of $(\sqrt{3}, 1, 0)$. Light is coupled out into the human eyes after reaching the first coupling-out grating 131. The semicircle of the coupling-in grating 120 near the side of the second coupling-out grating 132 is the second coupling-in grating 122 (the second type of one-dimensional straight-tooth grating), whose grating vector is 212 and vector direction is $(\sqrt{3}, -1, 0)$. After the light passes through the second type of one-dimensional straight-tooth grating, the class +1 diffraction is totally reflected in the waveguide in a direction of 30° from the horizontal plane and directed to the second coupling-out grating 132. The second coupling-out grating 132 is a two-dimensional grating and has a grating vector of 231 with a vector direction of $(-\sqrt{3}, -1, 0)$, a grating vector of 232 with a vector direction of $(0, 2, 0)$, and a grating vector of 251 with a vector direction of $(-\sqrt{3}, 1, 0)$. Light is coupled out into the human eyes after reaching the second coupling-out grating 132.

The coupling-in grating 120 adopts the combination of two types of one-dimensional grating with the grating vectors forming an included angle, and the grating can be a blazed grating, or a slanted grating. This allows for high coupling-in efficiency while increase the contour freedom of the waveguide due to more choices for the relative position of the grating.

In this application, the shape of the first coupling-out region is a polygon, and the shape of the second coupling-out region is a polygon. The shape can be the projected shape on the first surface 111 or the second surface 112 of the waveguide substrate 110, or can be the surface topography presented by imaging, for example, by electron microscopy. The number of linear edges of the polygon is greater than or equal to 3. For example, the shape of the polygon can be a triangle, trapezoid, rectangle, pentagon and other suitable shapes.

In some embodiments, the coupling-out grating (e.g., the first coupling-out grating 131 and the second coupling-out grating 132) can be fabricated by any suitable microfabrication process. For example, the grating can be fabricated on the surface or inside of the waveguide substrate 110 by photolithography or on the waveguide substrate 110 by nanoimprint lithography, thereby forming a surface relief diffraction grating. Wherein, the one-dimensional grating (such as a grating line) can be formed as a protrusion on the surface of the waveguide substrate 110, and the height of the protrusion can be reasonably set according to actual needs. It is worth mentioning that various shapes of gratings shown in this application are the shapes on the top surfaces of the gratings parallel to the surface of the optical waveguide (i.e., the surface on which the coupling-out grating or the coupling-in grating 120 is disposed), and the shapes can be cross-sectional shapes taken in a plane substantially parallel to the surface of the optical waveguide, or can be projection shapes projected on a plane parallel to the surface of the optical waveguide.

Alternatively, the coupling-out grating is a two-dimensional grating, or a combination of a one-dimensional grating and a two-dimensional grating. Wherein, the two-dimensional grating structure comprises a plurality of two-dimensional periodic structures. The two-dimensional periodic structure of the two-dimensional grating can be in the shape of a polygon, such as a quadrilateral, a pentagon, a hexagon, and other polygons, etc., and can also be a triangle or Reuleaux Triangle. The one-dimensional grating also comprises a plurality of periodic structures. For example, the one-dimensional grating can consist of a plurality of grating lines, and each of the grating lines can be formed by continuous connection of the plurality of periodic structures.

In order to endow the coupling-out grating with better coupling-out efficiency and coupling-out uniformity, alternatively, the grating period of the coupling-out grating can be 350 nm to 600 nm, or other suitable period lengths.

It is worth mentioning that the grating period can be the spacing of adjacent periodic structures in the direction of grating periodic arrangement.

Figure 8:
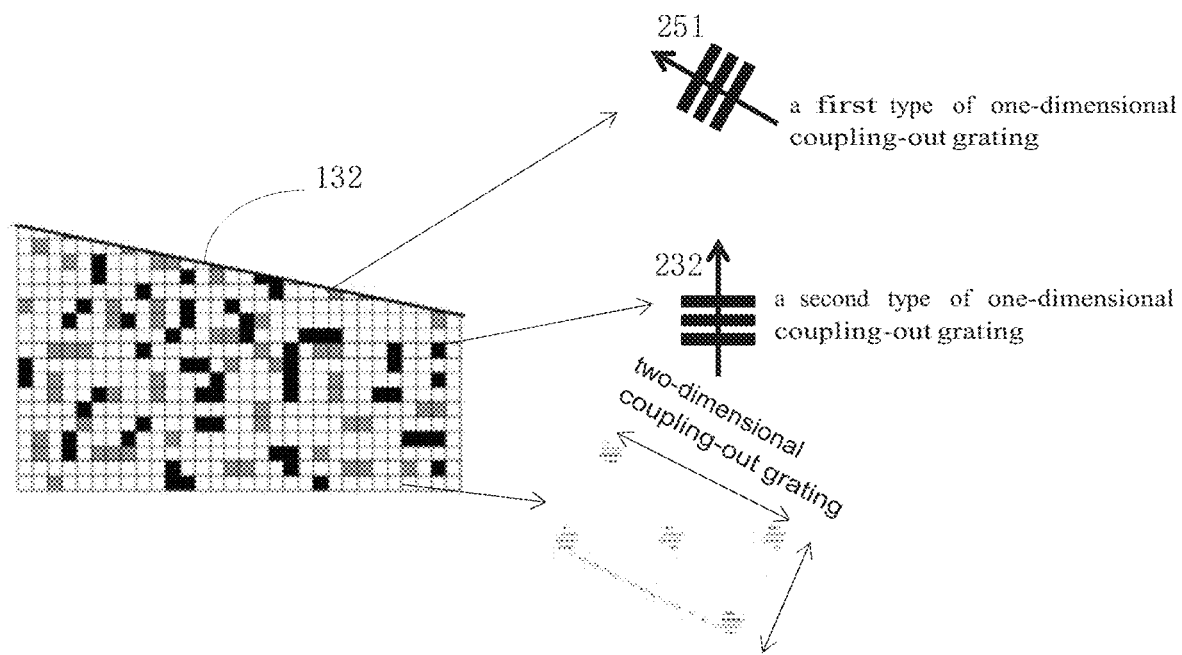
FIG. 8 shows a schematic view of a partitioning mode of the coupling-out grating according to an embodiment of the present application.

In order to improve the efficiency and coupling-out uniformity of the waveguide, in some embodiments, the first coupling-out grating 131 and the second coupling-out grating 132 can also be a combination of the one-dimensional grating and the two-dimensional grating, as shown in FIG. 8. The first coupling-out region and the second coupling-out region both comprise a plurality of partitions. The coupling-out grating arranged in a first group of partitions in the plurality of partitions is the two-dimensional grating, and the coupling-out grating arranged in a second group of partitions in the plurality of partitions is the one-dimensional grating. The plurality of partitions can be arranged according to regular partitions, for example, each partition can be a rectangular partition of the same dimension, or other shape-appropriate partitions of the same dimension. Or the plurality of partitions can also be arranged as irregular partitions, which can be the partitions with different dimensions and/or shapes. In some embodiments, the one-dimensional grating arranged in the partition can also consist of at least two types of the one-dimensional grating with different grating vectors. For example, the grating vector of the one-dimensional grating arranged in some partitions of the second group of partitions in the plurality of partitions is different from that of the one-dimensional grating arranged in the other partitions.

With reference to FIGS. 6 to 8, the semicircle of the coupling-in grating 120 near the side of the second coupling-out grating 132 is the second type of one-dimensional straight-tooth grating, whose grating vector is 212 and vector direction is ($\sqrt{3}$, −1, 0). After the light passes through the second type of one-dimensional straight-tooth grating, the class +1 diffraction is totally reflected in the waveguide in a direction of 30° from the horizontal plane and directed to the second coupling-out grating 132. The second coupling-out grating 132 comprises a first type of one-dimensional coupling-out grating with a grating vector of 251 and a vector direction of (−$\sqrt{3}$, 1, 0), a second type of the one-dimensional coupling-out grating with a grating vector of 232 and a vector direction of (0, 2, 0), and the two-dimensional coupling-out grating with a grating vector of 231. Light is coupled out into the human eyes after reaching the second coupling-out grating 132.

Since the coupling-in end in examples of this application uses spectro-symmetric grating, such as the non-blazed grating and slanted grating, it may make the efficiency of the waveguide low. In view of this, the hybrid grating of one-dimensional grating and two-dimensional grating is used in the coupling-out region in embodiments of this application. As such, the efficiency of the waveguide can be effectively improved by utilizing the high efficiency of one-dimensional grating and the multiple grating vectors of two-dimensional grating, thereby making up for the defect of the low efficiency at the coupling-in end. Moreover, the first coupling-out grating 131 and the second coupling-out grating 132 mixes the one-dimensional grating and two-dimensional grating, which can also effectively improve the energy uniformity of the coupling-out end.

It is worth mentioning that in the embodiments of this application, the sum of the grating vector of the coupling-in grating 120 and the grating vector of the coupling-out grating is zero, so as to ensure that the light coupled out from the coupling-out grating exits in parallel to the incident light coupled into the coupling-in grating 120. When the coupling-in grating 120 is determined, the grating vector of the coupling-out grating needs to be accordingly adjusted to meet that the sum of the grating vectors is zero.

In another aspect, the present application further provides a display device, which can comprise the aforementioned diffractive optical waveguide 100, wherein the description of the diffractive optical waveguide 100 can be referenced from the above and will not be repeated here.

The display device can be any device comprising the aforementioned diffractive optical waveguide 100. For example, the display device can be a near-eye display device, which may comprise: a lens and a frame for holding the lens near eyes, the lens including the diffractive optical waveguide 100.

Figure 9:
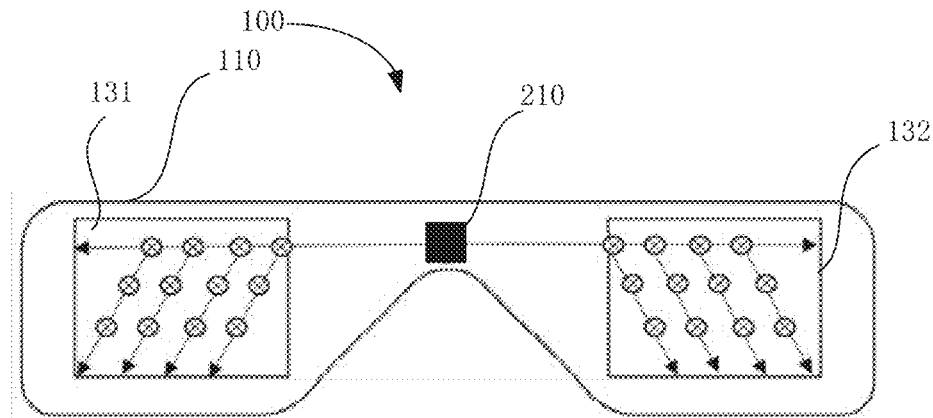
FIG. 9 shows a front view of a display device according to an embodiment of the present application.
Figure 10:
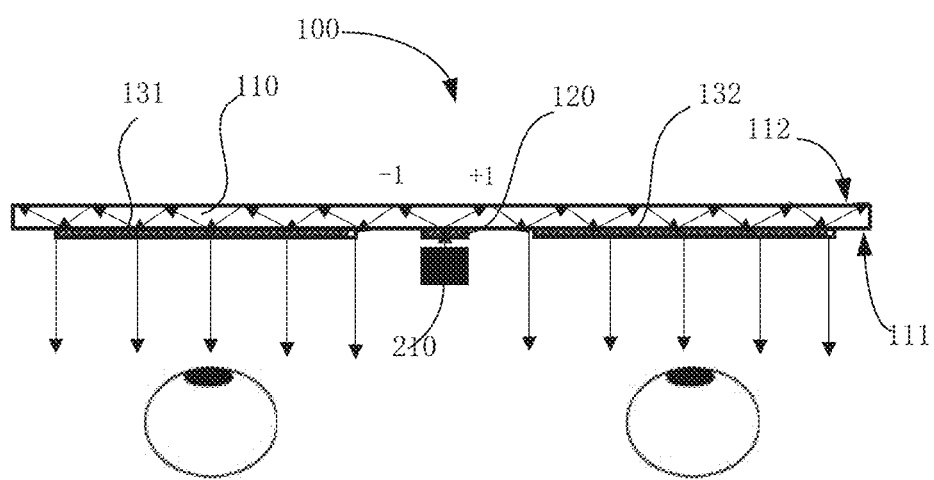
FIG. 10 shows a top view of a display device according to an embodiment of the present application.

In some examples, as shown in FIGS. 9 and 10, the display device can further comprise an optical machine 210. Alternatively, the optical machine 210 can project image light onto the diffractive optical waveguide 100, e.g., into the area where the coupling-in grating 120 of the diffractive optical waveguide 100 is located. Wherein, the optical machine 210 can be micro displays, such as a laser beam scanning (LBS), a digital light procession (DLP), a digital micromirror device (DMD), a liquid crystal on silicon (LCOS), a micro electromechanical system (MEMS), an organic light emitting diode (OLED), a Micro LED optical machine, or the like. The light emitted by the optical machine 210 is visible light.

Further, the display device can also comprise an actuating device for actuating the optical machine 210 to project image light onto the coupling-in grating 120 of the diffractive optical waveguide 100, therein the actuating device can comprise an actuating circuit, which may include a MOSFET, a capacitor, a resistor or other suitable components. The display device can further comprise a controller that is electrically connectable to the actuating circuit. The actuating device is controlled via the controller to actuate the optical machine 210 to project image light onto the coupling-in grating 120 of the diffractive optical waveguide.

Alternatively, the area of the coupling-in region can be greater than or equal to the area of the light speckle projected by the optical machine 210 onto the coupling-in region. Alternatively, the optical axis of the image light projected by the optical machine 210 is perpendicular to the surface of the waveguide substrate 110 of the diffractive optical waveguide, so as to ensure the quality of the final image.

The light (e.g., image light) projected by the optical machine 210 onto the diffractive optical waveguide 100 is coupled into the waveguide substrate 110 through the coupling-in grating 120 and to the first coupling-out grating 131 and the second coupling-out grating 132 by totally reflection and coupled out of the first coupling-out grating 131 and the second coupling-out grating 132 and then enters the viewer's eyes wearing the near-eye device, thereby allowing the viewer to see the image projected by the optical machine 210. In the diffractive optical waveguide of the present application, the center of the coupling-in region deviates from the center line connecting the center of the first coupling-out region and the center of the second coupling-out region, such that the optical machine 210 deviates from the center line 101 when the diffractive optical waveguide is applied to a display device such as a near-eye display device and is placed on the nose bridge of the wearer. As such, the diffractive optical waveguide is more ergonomic. Moreover, by enabling the diffractive optical waveguide of the present application to couple the input light out to the users eyes through pupil expansion, there is no need to equip the user with two sets of diffractive waveguides and two sets of optical machines. Compared to the display device with two sets of diffractive optical waveguides, the present application only needs to be equipped with one set of the optical machine and one set of the diffractive optical waveguide, whose structure is simpler; assembly difficulty is significantly reduced; and power consumption is lower.

In some embodiments, the display device is an augmented reality display device or a virtual reality display device, wherein the augmented reality display device includes but is not limited to the devices such as augmented reality (AR) glasses, an automotive head-up display (HUD), or the like.

It should be noted that the above-described embodiments are intended to illustrate but not limit the application, and alternative embodiments can be devised by those skilled in the art without departing from the scope of the appended claims. In the claims, any reference signs in parentheses shall not be construed as limiting the claim. The application can be implemented by means of hardware comprising several different elements as well as by means of a suitably programmed computer. In a unit claim listing several devices, some of these devices can be presented by the same one of hardware. The use of the words, such as first, second, and third, does not denote any order. These words can be interpreted as terms.

As discussed above with reference to the illustration of the figures, the followings are provided in this application:

(1) A diffractive optical waveguide for optical pupil expansion, comprising:

a waveguide substrate comprising a coupling-in region and a coupling-out region, wherein the coupling-out region includes a first coupling-out region and a second coupling-out region; and the first coupling-out region and the second coupling-out region are respectively used for corresponding to a left eye and a right eye of human eyes;

a coupling-in grating disposed on or in the waveguide substrate and located in the coupling-in region and configured to couple input light into the waveguide substrate to cause the light to propagate within the waveguide substrate through total reflection, wherein a first diffractive light obtained by the input light diffracted by the coupling-in grating is totally reflected in the waveguide substrate and directed to the first coupling-out region, and a second diffractive light obtained by the input light diffracted by the coupling-in grating is totally reflected in the waveguide substrate and directed to the second coupling-out region;

a coupling-out grating comprising a first coupling-out grating disposed on or in the waveguide substrate and located in the first coupling-out region and a second coupling-out grating disposed on or in the waveguide substrate and located in the second coupling-out region, the first coupling-out grating and the second coupling-out grating both configured to couple at least a portion of light propagating therein out of the waveguide substrate by diffraction; wherein, the first coupling-out region and the second coupling-out region are respectively located at both sides of the coupling-in region, and a center of the coupling-in region deviates from a center line connecting a center of the first coupling-out region and a center of the second coupling-out region.

(2) The diffractive optical waveguide of item (1), wherein the first coupling-out region and the second coupling-out region are mirror-symmetric with respect to a central axis of the waveguide substrate, and the central axis of the waveguide substrate passes through the center of the coupling-in region and is perpendicular to the center line; and/or the waveguide substrate is mirror-symmetric with respect to the central axis; and/or a distance between the center of the coupling-in region and the center of the first coupling-out region is equal to a distance between the center of the coupling-in region and the center of the second coupling-out region, (3) The diffractive optical waveguide of item (1), wherein the center of the coupling-in region is located above a center of the waveguide substrate.

(4) The diffractive optical waveguide of item (I), wherein an offset of the center of the coupling-in region relative to the center line satisfies the following formula:

$$0 < H < \max\left(\frac{\sqrt{L^2 + W^2}}{2}, \frac{D}{2}\right)$$

wherein H is an offset of the center of the coupling-in region relative to the center line; D is a distance between the center of the first coupling-out region and the center of the second coupling-out region; L is a maximum transverse width of the first coupling-out region or the second coupling-out region; and W is a maximum longitudinal width of the first coupling-out region or the second coupling-out region.

(5) The diffractive optical waveguide of item (1), wherein an offset of the center of the coupling-in region relative to the center line satisfies the following formula:

$$\frac{d}{2} < H < \max\left(\frac{\sqrt{L^2 + W^2}}{2} - \frac{d}{2}, \frac{D}{2} - \frac{d}{2}\right)$$

wherein H is an offset of the center of the coupling-in region relative to the center line; D is a distance between the center of the first coupling-out region and the center of the second coupling-out region; L is a maximum transverse width of the first coupling-out region or the second coupling-out region; W is a maximum longitudinal width of the first coupling-out region or the second coupling-out region; and d is a maximum transverse dimension of the coupling-in region.

(6) The diffractive optical waveguide of item (5), wherein, the maximum transverse width of the first coupling-out region or the second coupling-out region is greater than 20 mm and less than 40 mm;

the maximum longitudinal width of the first coupling-out region or the second coupling-out region is greater than 20 mm and less than 30 mm;

a spacing between the center of the second coupling-out region and the center of the first coupling-out region is 55 mm to 75 mm;

the shape of the coupling-in region is a circle or polygon, wherein the maximum transverse dimension of the coupling-in region is 2 mm to 6 mm.

(7) The diffractive optical waveguide of item (1), wherein a period of the coupling-in grating is 350 nm to 600 nm; and/or the coupling-in grating is a one-dimensional grating, a two-dimensional grating, a metasurface coupling-in structure, or is formed by a first coupling-in grating and a second coupling-in grating with different grating vectors joined together, wherein the first coupling-in grating and the second coupling-in grating both are one-dimensional gratings.

(8) The diffractive optical waveguide of item (7), wherein when the coupling-in grating is a one-dimensional grating with the same grating vector, one of the first diffractive light and the second diffractive light is a class −1 diffractive light, and the other is a class +1 diffractive light.

(9) The diffractive optical waveguide of item (7), wherein when the coupling-in grating is formed by the first coupling-in grating and the second coupling-in grating with different grating vectors joined together, the first coupling-in grating is close to the first coupling-out region, and the second coupling-in grating is close to the second coupling-out region; wherein the first diffractive light obtained by the input light diffracted by the first coupling-in grating is totally reflected in the waveguide substrate and directed to the first coupling-out region, and the second diffractive light obtained by the input light diffracted by the second coupling-in grating is totally reflected in the waveguide substrate and directed to the second coupling-out region.

(10) The diffractive optical waveguide of item (9), wherein when the coupling-in grating is formed by the first coupling-in grating and the second coupling-in grating with different grating vectors joined together, an included angle between a grating vector of the first coupling-in grating and a grating vector of the second coupling-in grating is greater than 90° and less than or equal to 180°.

(11) The diffractive optical waveguide of item (1), wherein a grating period of the coupling-out grating is 350 nm to 600 nm; and/or the coupling-out grating is a two-dimensional grating, or a combination of a one-dimensional grating and a two-dimensional grating.

(12) The diffractive optical waveguide of item (1), wherein when the coupling-out grating is a combination of a one-dimensional grating and a two-dimensional grating, the first coupling-out region and the second coupling-out region both comprise a plurality of partitions; a coupling-out grating arranged in a first group of partitions in the plurality of partitions is a two-dimensional grating, and a coupling-out grating arranged in a second group of partitions in the plurality of partitions is a one-dimensional grating.

(13) The diffractive optical waveguide of item (12), wherein a grating vector of the one-dimensional grating arranged in some partitions of the second group of partitions is different from that of the one-dimensional grating arranged in the other partitions.

(14) The diffractive optical waveguide of any one of items (1) to (13), Wherein a sum of a grating vector of the coupling-in grating and a grating vector of the coupling-out grating is zero.

(15) The diffractive optical waveguide of any one of items (1) to (13), wherein the first coupling-out region and the second coupling-out region both are of polygons, and the number of linear edges of the polygons is greater than or equal to 3; and/or
a thickness of the waveguide substrate is greater than or equal to 0.4 mm, and less than or equal to 2 mm.

(16) A display device, comprising: the diffractive optical waveguide of any one of items (1) to (15), an optical machine, and an actuating device, wherein the actuating device is configured to actuate the optical machine to project image light onto the coupling-in grating of the diffractive optical waveguide.

(17) The display device of item (16), wherein an optical axis of the image light projected by the optical machine is perpendicular to a surface of the waveguide substrate of the diffractive optical waveguide.

(18) The display device of item (16), wherein the optical machine is any one of: DLP optical machine, Mems optical machine, or MicroLED optical machine.

(19) The display device of item (16), wherein the display device is a near-eye display device, comprising: a lens and a frame for holding the lens near eyes, the lens including said diffractive optical waveguide.

(20) The display device of any one of items (16) to (19), wherein the display device is an augmented reality display device or a virtual reality display device.

The invention claimed is:

1. A diffractive optical waveguide for optical pupil expansion, comprising:
a waveguide substrate comprising a coupling-in region and a coupling-out region, wherein the coupling-out region includes a first coupling-out region and a second coupling-out region, and the first coupling-out region and the second coupling-out region are respectively used for corresponding to a left eye and a right eye of human eyes;

a coupling-in grating disposed on or in the waveguide substrate and located in the coupling-in region and configured to couple input light into the waveguide substrate to cause the light to propagate within the waveguide substrate through total reflection, wherein a first diffractive light obtained by the input light diffracted by the coupling-in grating is totally reflected in the waveguide substrate and directed to the first coupling-out region, and a second diffractive light obtained by the input light diffracted by the coupling-in grating is totally reflected in the waveguide substrate and directed to the second coupling-out region;

a coupling-out grating comprising a first coupling-out grating disposed on or in the waveguide substrate and located in the first coupling-out region and a second coupling-out grating disposed on or in the waveguide substrate and located in the second coupling-out region, the first coupling-out grating and the second coupling-out grating both configured to couple at least a portion of light propagating therein out of the waveguide substrate by diffraction, wherein, the first coupling-out region and the second coupling-out region are respectively located at both sides of the coupling-in region; a center of the coupling-in region deviates from a center line connecting a center of the first coupling-out region and a center of the second coupling-out region, and the center of the coupling-in region is located above a center of the waveguide substrate;

wherein an offset of the center of the coupling-in region relative to the center line satisfies the following formula:

$$\frac{d}{2} < H < \max\left(\frac{\sqrt{L^2 + W^2}}{2} - \frac{d}{2}, \frac{D}{2} - \frac{d}{2}\right)$$

wherein H is an offset of the center of the coupling-in region relative to the center line; D is a distance between the center of the first coupling-out region and the center of the second coupling-out region; L is a maximum transverse width of the first coupling-out region or the second coupling-out region; W is a maximum longitudinal width of the first coupling-out region or the second coupling-out region; and d is a maximum transverse dimension of the coupling-in region; and wherein the coupling-in grating as well as the first coupling-out grating and the second coupling-out grating are located on the same side or either side of the waveguide substrate.

2. The diffractive optical waveguide of claim 1, wherein the first coupling-out region and the second coupling-out region are mirror-symmetric with respect to a central axis of the waveguide substrate, and the central axis of the waveguide substrate passes through the center of the coupling-in region and is perpendicular to the center line; and/or the waveguide substrate is mirror-symmetric with respect to the central axis; and/or a distance between the center of the coupling-in region and the center of the first coupling-out region is equal to a distance between the center of the coupling-in region and the center of the second coupling-out region.

3. The diffractive optical waveguide of claim 1, wherein,
the maximum transverse width of the first coupling-out region or the second coupling-out region is greater than 20 mm and less than 40 mm;
the maximum longitudinal width of the first coupling-out region or the second coupling-out region is greater than 20 mm and less than 30 mm;
a spacing between the center of the second coupling-out region and the center of the first coupling-out region is 55 mm to 75 mm;
the shape of the coupling-in region is a circle or polygon, wherein the maximum transverse dimension of the coupling-in region is 2 mm to 6 mm.

4. The diffractive optical waveguide of claim 1, wherein a period of the coupling-in grating is 350 nm to 600 nm; and/or
the coupling-in grating is a one-dimensional grating, a two-dimensional grating, a metasurface coupling-in structure, or is formed by a first coupling-in grating and a second coupling-in grating with different grating vectors joined together, wherein the first coupling-in grating and the second coupling-in grating both are one-dimensional gratings.

5. The diffractive optical waveguide of claim 4, wherein when the coupling-in grating is a one-dimensional grating with the same grating vector, one of the first diffractive light and the second diffractive light is a class −1 diffractive light, and the other is a class +1 diffractive light.

6. The diffractive optical waveguide of claim 4, wherein when the coupling-in grating is formed by the first coupling-in grating and the second coupling-in grating with different grating vectors joined together, the first coupling-in grating is close to the first coupling-out region, and the second coupling-in grating is close to the second coupling-out region, wherein the first diffractive light obtained by the input light diffracted by the first coupling-in grating is totally reflected in the waveguide substrate and directed to the first coupling-out region, and the second diffractive light obtained by the input light diffracted by the second coupling-in grating is totally reflected in the waveguide substrate and directed to the second coupling-out region.

7. The diffractive optical waveguide of claim 6, wherein when the coupling-in grating is formed by the first coupling-in grating and the second coupling-in grating with different grating vectors joined together, an included angle between a grating vector of the first coupling-in grating and a grating vector of the second coupling-in grating is greater than 90° and less than or equal to 180°.

8. The diffractive optical waveguide of claim 1, wherein a grating period of the coupling-out grating is 350 nm to 600 nm; and/or
the coupling-out grating is a two-dimensional grating, or a combination of a one-dimensional grating and a two-dimensional grating.

9. The diffractive optical waveguide of claim 1, wherein when the coupling-out grating is a combination of a one-dimensional grating and a two-dimensional grating, the first coupling-out region and the second coupling-out region both comprise a plurality of partitions; a coupling-out grating arranged in a first group of partitions in the plurality of partitions is a two-dimensional grating, and a coupling-out grating arranged in a second group of partitions in the plurality of partitions is a one-dimensional grating.

10. The diffractive optical waveguide of claim 9, wherein a grating vector of the one-dimensional grating arranged in some partitions of the second group of partitions is different from that of the one-dimensional grating arranged in the other partitions.

11. The diffractive optical waveguide of claim 1, wherein a sum of a grating vector of the coupling-in grating and a grating vector of the coupling-out grating is zero.

12. The diffractive optical waveguide of claim 1, wherein the first coupling-out region and the second coupling-out region both are of polygons, and the number of linear edges of the polygons is greater than or equal to 3; and/or
a thickness of the waveguide substrate is greater than or equal to 0.4 mm, and less than or equal to 2 mm.

13. A display device, comprising: the diffractive optical waveguide of claim 1, an optical machine, and an actuating device, wherein the actuating device is configured to actuate the optical machine to project image light onto the coupling-in grating of the diffractive optical waveguide.

14. The display device of claim 13, wherein an optical axis of the image light projected by the optical machine is perpendicular to a surface of the waveguide substrate of the diffractive optical waveguide.

15. The display device of claim 13, wherein the optical machine is any one of: DLP optical machine, Mems optical machine, or MicroLED optical machine.

16. The display device of claim 13, wherein the display device is a near-eye display device, comprising: a lens and a frame for holding the lens near eyes, the lens including said diffractive optical waveguide.

17. The display device of claim 13, wherein the display device is an augmented reality display device or a virtual reality display device.

* * * * *

UNITED STATES PATENT AND TRADEMARK OFFICE
CERTIFICATE OF CORRECTION

PATENT NO. : 11,874,503 B1
APPLICATION NO. : 18/346410
DATED : January 16, 2024
INVENTOR(S) : Xingming Zhao et al.

It is certified that error appears in the above-identified patent and that said Letters Patent is hereby corrected as shown below:

On the Title Page

Insert:
--(30) Foreign Application Priority Data
July 2, 2022 (CN) .............. 202210778028.2--

Signed and Sealed this
Twelfth Day of November, 2024

Katherine Kelly Vidal
*Director of the United States Patent and Trademark Office*